118,659

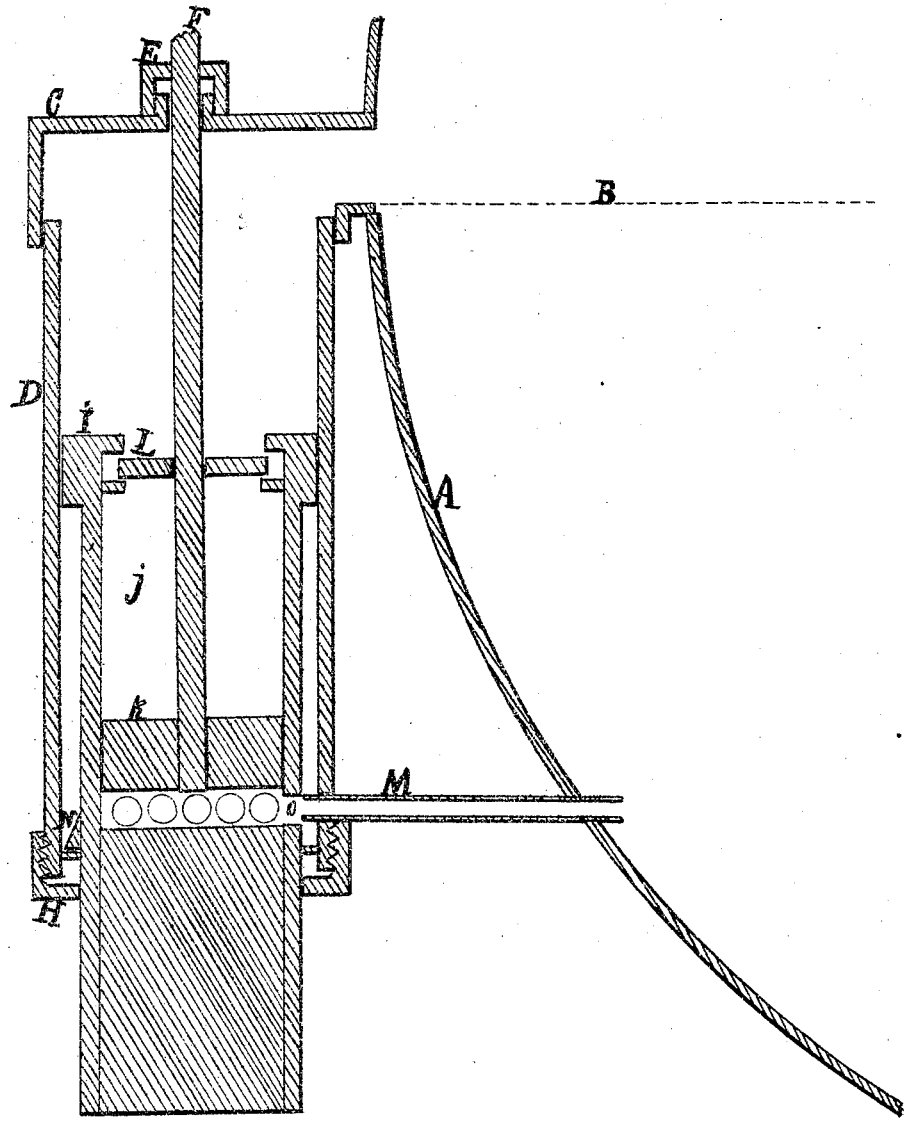

UNITED STATES PATENT OFFICE.

SHEPHERD H. WHEELER, OF DOWAGIAC, MICHIGAN.

IMPROVEMENT IN PUMP-REGULATORS.

Specification forming part of Letters Patent No. 118,659, dated August 29, 1871; antedated August 21, 1871.

*To all whom it may concern:*

Be it known that I, SHEPHERD H. WHEELER, of Dowagiac, in the county of Cass and State of Michigan, have invented certain Improvements in the Mode of Regulating the Action of Pumps, of which the following is a specification:

The nature of my invention relates to a method of regulating the supply of water to steam-boilers and analogous purposes where it is desirable to maintain a uniform quantity of water at a uniform stage. As a means to accomplish this purpose I obtain a mechanical effect arising from the difference in the action of steam and water, or analogous substances, when admitted to the valved chamber in which the plunger of a force-pump works, as will be hereinafter described; the object being to maintain a more perfect uniformity of the stage of water in steam-boilers and similar purposes than has been done heretofore.

To enable others to make and use my invention, I will proceed to describe it.

The accompanying drawing is a vertical longitudinal view through the diameter of a device embodying my invention, in which—

A is a section of a steam-boiler. B shows the water-line. D is a tube communicating with the water in the boiler at the water-line B. The upper end of said tube is provided with the stuffing-box E, through which the plunger-rod F works. A stuffing-box, H, is attached to the lower end of tube D, through which the hollow plunger $i$ works. This plunger is about the length of the tube D and fits snugly within it, and when at rest projects through the lower end about one-third of its length. The upper part of this plunger is hollow, forming the chamber $j$, in which the plunger $k$ works. This chamber is provided with the valve L, opening inward. This valve is not steam-tight, and will allow the steam or air or other analogous substances to pass freely in and out of the chamber $j$; but is sufficiently tight to materially obstruct the passage of water or other liquids from the chamber $j$. The pipe M communicates with the interior of the boiler A and chamber $j$ through the opening O when the plunger $i$ is at rest. A reciprocating movement is given to plunger $k$ by means of suitable connection with the engine, which will be constant when the engine is in motion.

Now it will be seen that when the water in the boiler is below the line B that steam only will pass into the chamber $j$, and as the valve L is not steam-tight it will offer no material resistance to the movement of the plunger $k$, and as the upper end of plunger $i$ is subject to the full pressure of steam, it will be firmly pressed on the seat N; but when water is up to the line B it will flow into the chamber $j$, and, being a more dense medium than steam, it will not be able to escape through the leak in the valve L, and will be forced by the plunger $k$ against the valve L, lifting the plunger $i$ with the plunger $k$, and both will continue to reciprocate as long as the water remains up to the line B; but should the water fall below the line B it will cease to supply the chamber $j$ and the water in said chamber will gradually leak out and the plunger $i$ will come to rest, as before, or part steam and part water may occupy the chamber $j$, in which case the plunger $k$ will rise until the steam is expelled, when the water in said chamber will compel the plunger $i$ to move the remainder of the stroke.

Thus it will be seen that while there is water to supply the chamber $j$ there will be a mechanical action of the plunger $i$, which will not be the case when steam only can reach said chamber. Then if the plunger $i$ is connected with the crank-arm of a stop-cock in the feed-pipe of the force-pump of a steam-boiler or other reservoir to which this regulator is attached, the flow of liquid will be checked; or if the plunger $i$ is at rest, the said cock will be held open and a full supply of water given to the force-pump, whose greatest capacity must be equal to or greater than the rate of consumption of water in the boiler. I do not show the boiler nor force-pump, as I use common devices for that purpose.

Having thus described my invention in such exact terms as I can give, what I claim, and desire to secure by Letters Patent, is—

1. The method herein described for regulating the supply of water or liquids to steam-boilers or other reservoirs, substantially as and for the purposes set forth.

2. As a means of applying the above-claimed method to accomplish the purposes set forth, the tube or pump herein described, consisting of the tube D, plungers $i$ and $k$, rod F, valve L, pipe M, stuffing-box H, seat N, and opening O, substantially as and for the purposes hereinbefore set forth.

SHEPHERD H. WHEELER.

Witnesses:
ROSCOE B. WHEELER,
CHAUNCEY T. LEE.